United States Patent Office 2,802,829
Patented Aug. 13, 1957

2,802,829

RED VAT DYESTUFFS OF THE DIPYRAZOLAN-THRONE SERIES

Wilhelm Schmidt-Nickels, Little York, N. J., assignor to General Aniline & Film Corporation, New York, N. Y., a corporation of Delaware No Drawing. Application December 28, 1955,
Serial No. 555,795

13 Claims. (Cl. 260—312)

This invention relates to novel vat dyes of the dipyrazolanthrone series which yield red colorations on cellulosic materials, when applied thereto from an alkaline hydrosulfite vat with subsequent oxidation on the fiber. The invention also includes the process of preparing said dyestuffs.

The vat dyestuffs of this invention are N,N'-bis(beta-cyanoethyl)-dipyrazolanthrones, unsubstituted or containing nuclear substituents of the class consisting of halogen (e. g., chlorine or bromine), lower alkyl (e. g., methyl, ethyl) and amino groups.

The unsubstituted dyestuff has the formula:

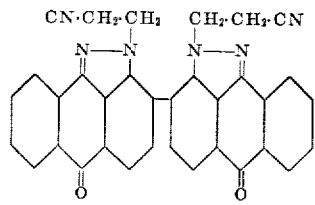

Preparation of the dyestuffs of the invention is effected by reacting acrylonitrile in the presence of an organic quaternary nitrogen base (e. g., tetraethanol ammonium hydroxide) using either an excess of acrylonitrile as the reaction solvent or an inert organic solvent such as tertiary butanol, with dipyrazolanthrone or a substituted dipyrazolanthrone in which substituents of the benzene rings are of the class consisting of halogen, lower alkyl and amino groups. Suitable reaction temperatures range from room temperature (e. g., 25° C.) to 100° C. The dyestuffs are advantageously recovered by filtration from the reaction mixture and washed with a solvent such as acetone.

The preparation of chloro- and bromo - substituted N,N' - bis(beta - cyanoethyl)dipyrazolanthrones can be effected by employing the corresponding halogen-substituted dipyrazolanthrone as the intermediate for condensation with acrylonitrile, or, alternatively, they can be prepared by first condensing acrylonitrile with dipyrazolanthrone, and then halogenating the resulting dyestuff with chlorine or bromine (or a reagent liberating the same) in a suitable solvent such as chlorosulfonic acid, advantageously also in the presence of a halogenation catalyst such as iodine.

The resulting dyestuffs can be converted into corresponding leuco sulfuric ester salts by reduction with a metal such as iron (especially in conjunction with copper) in an esterifying mixture of pyridine and chlorosulfonic acid. The mixture is neutralized with an alkali metal carbonate, the pyridine distilled, and the leuco sulfuric ester salt recovered by salting out.

The vat dyes of the invention yield dark red shades on cotton when applied from an alkaline hydrosulfite vat, the resulting shades being fast to washing, light, and chlorine. The corresponding leuco sulfuric ester salts produce similar shades when applied to textiles and developed under acid oxidizing conditions.

My invention will be more fully understood from the following examples, wherein parts and percentages are by weight, unless otherwise indicated:

*Example 1*

5 parts of dipyrazolanthrone, 40 parts of acrylonitrile, and 2 parts by volume of aqueous 40% tetraethanol ammonium hydroxide were mixed together and agitated under reflux. The temperature rose spontaneously from 28–42° C., and then dropped to 37° C. over a period of 1¾ hours. The mixture was then heated on a steam bath to 79° C. over a period of 40 minutes, and then cooled to room temperature. The mixture was diluted with 80 parts of acetone, the insoluble reaction product filtered out and washed on the filter with acetone. After re-slurrying with 80 parts of acetone, filtering and again washing, the product was dried. The material obtained is a red powder, yielding blue alkaline hydrosulfite vats in which cotton is dyed in powerful deep red shades of good fastness to chlorine, washing and light. The product of this example is N,N' - bis(beta - cyanoethyl)dipyrazolanthrone.

*Example 2*

5 parts of dipyrazolanthrone, 40 parts of acrylonitrile and 4 parts by volume of aqueous 20% trimethylphenyl ammonium hydroxide were mixed, with agitation under reflux. The temperature arose spontaneously from 28–44° C., and then fell to 42° C. over a period of about 2 hours. The mixture was then heated on a steam bath at 75–80° C. for 2 hours, and after cooling, diluted with 80 parts of acetone. The dyestuff thereby precipitated was recovered by filtration and washed, re-slurried, and again washed with acetone, as in Example 1. A dyestuff identical with the product of Example 1 was thus obtained.

*Example 3*

4.4 parts of dipyrazolanthrone, 17.5 parts of tertiary butanol, 17.5 parts of acrylonitrile, 10.5 parts of an aqueous 40% solution of tetraethanol ammonium hydroxide were mixed and agitated under reflux. The reaction temperature rose spontaneously from 28–40° C., then dropped to 39° C. during about 17 minutes. The mixture was then heated to 85-90° C. for 2 hours. After cooling, the insoluble dyestuff was filtered out, and washed with ethanol and then with acetone. The product obtained was identical with that of Example 1.

*Example 4*

5 parts of 4,4' - dimethyldipyrazolanthrone, prepared according to German Patent 301,554, 40 parts of acrylonitrile, and 2 parts by volume of aqueous 40% tetraethanol ammonium hydroxide were mixed and agitated under reflux. The temperature rose from 30–36° C. and then dropped to 35° C. over a period of 45 minutes. The mixture was then heated to 78–80° C. for one hour. After cooling, the mixture was diluted with 80 parts of acetone, filtered, and the filter cake washed with acetone. The dyestuff yielded an alkaline hydrosulfite vat from which cotton was dyed in shades similar to those of the preceding example. The dyestuff obtained was N,N' - bis(beta - cyanoethyl) - 4,4' - dimethyldipyrazolanthrone.

Instead of dimethyldipyrazolanthrone, 8,8' - diaminodipyrazolanthrone can be used to yield the corresponding 8,8' - diamino - N,N' - bis(beta - cyanoethyl)dipyrazolanthrone by the procedure of this example.

*Example 5*

4 parts of N,N' - bis(beta - cyanoethyl)dipyrazolanthrone, prepared as described in Example 1, were dissolved in 44 parts of chlorosulfonic acid containing 0.3 parts of iodine and 1.56 parts of bromine were added. The temperature was raised over a period of 2 hours to 70° C. and maintained at this level ½-hour. Then the mixture was cooled to 25° C. and gradually poured onto 250 parts of ice. The dyestuff thereby precipitated was filtered out, washed with water and dried. Analysis indicated it to contain 15.6% bromine. It yielded a blue alkaline hydrosulfite vat from which cotton was dyed in powerful red shades, which were somewhat more bluish than those obtained with the dyestuff of Example 1. It was a mixture of mono- and dibromo- N,N' - bis-(beta-cyanoethyl)dipyrazolanthrone.

Example 6

15.5 parts of N,N'-bis(beta-cyanoethyl)dipyrazolanthrone of Example 1, 9.6 parts of powdered iron, and 0.2 parts of cuprous chloride were added to a mixture of 147 parts of pyridine with 27 parts of chlorosulfonic acid. The resulting mixture was agitated 3 hours at 53–55° C. under an atmosphere of carbon dioxide, and then poured into an aqueous solution of 48 parts of sodium carbonate. Pyridine was removed by distillation under reduced pressure and the residual slurrying was filtered at room temperature, yielding as a filter cake a mixture of iron carbonate and the sodium leuco sulfuric ester salt of the vat dyestuff. The filter cake was stirred with boiling water containing sufficient caustic soda to maintain an alkaline reaction, and filtered while hot. Sodium chloride was added to the filtrate, and the leuco sulfuric ester sodium salt of the vat dye thereby precipitated was recovered by filtration. When used in the form of a paste for printing cotton, followed by development under acid oxidizing conditions, strong red shades were produced, similar to those obtained with the dyestuff of Example 1.

In preparing vat dyestuffs of this invention, as illustrated in the foregoing examples, unsubstituted dipyrazolanthrone can be replaced by nuclear-substituted dipyrazolanthrones containing as nuclear substituents chlorine, bromine, lower alkyl groups such as methyl or ethyl groups or amino groups (e. g., mono- or dichloro- or mono- or dibromodipyrazolanthrone, or the 4,4'-dimethyl or 8,8'-diaminodipyrazolanthrones of German Patent 301,554.)

Acrylonitrile is preferably employed in substantial excess by weight (e. g., 3–12 parts per part by weight of dipyrazolanthrone).

Quaternary ammonium hydroxides serving as condensation catalysts are advantageously employed in concentrations from 1–10% of the reaction mixture. A solvent, while not essential, can be employed, and is preferably a liquid oxygenated organic solvent, inert under the reaction conditions, as, for example, alcohols, ketones, or ethers having a boiling point of at least 80° C.

Initial stages of the condensation occurring upon admixture of the dipyrazolanthrone compound and acrylonitrile in the presence of an organic base result in a spontaneous rise in temperature. The reaction is advantageously carried to completion by heating, for example, at temperatures of 50–100° C. for a period of 1–5 hours.

The vat dye produced by the condensation of this invention can be recovered by filtration and washed with an organic liquid such as ethanol or acetone. Halogen can be introduced as a substituent in the nucleus of the vat dyes of this invention, either prior to or subsequent to condensation of acrylonitrile with the dipyrazolanthrone compound. Such halogenation is advantageously effected by introducing chlorine or bromine (or a reagent liberating these elements) into a mixture of the dipyrazolanthrone compound in a halogenation solvent such as chlorosulfonic acid, preferably in the presence of a halogenation catalyst such as iodine.

Conversion of the vat dyestuffs of this invention into corresponding leuco sulfuric ester salts can be readily effected by reduction with a reducing metal such as iron (preferably in the presence of copper) and esterification, in a mixture of a tertiary nitrogen base such as pyridine or dimethylaniline with chlorosulfonic acid. After neutralizing with an alkali metal carbonate or hydroxide, and removal of the tertiary base by distillation, the leuco sulfuric ester salt can be recovered by salting out from the reaction mixture.

Variations which will be obvious to those skilled in the art can be made in the foregoing examples and general procedure without departing from the scope or spirit of the invention.

I claim:

1. As vat dyestuffs, N,N'-bis(beta-cyanoethyl)dipyrazolanthrones the class consisting of a compound having the formula:

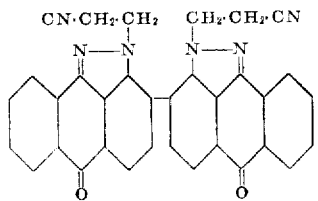

and nuclear chloro, bromo, amino and lower alkyl derivatives thereof.

2. An alkali metal leuco sulfuric ester salt of a vat dyestuff, as defined in claim 1.

3. A vat dyestuff having the following formula:

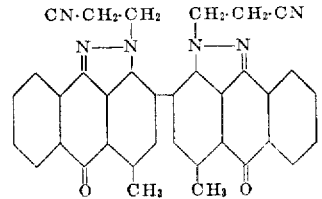

4. A vat dyestuff having the following formula:

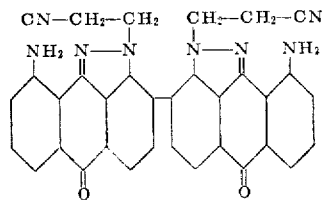

5. A vat dyestuff having the following formula:

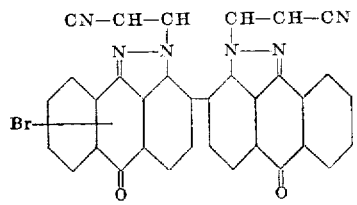

6. A process for the preparation of a vat dyestuff of the dipyrazolanthrone series which comprises heating together a member of the class consisting of dipyrazolanthrone and lower alkyl, chloro-, bromo- and amino-substituted dipyrazolanthrones in which said substituents are directly attached to an anthraquinone nucleus, with an excess by weight of acrylonitrile in the presence of an organic base at a temperature from 50–100° C., and separating the resulting condensation product from the reaction mixture.

7. A process as defined in claim 6, wherein the final condensation product is halogenated by treatment with a member of the class consisting of chlorine and bromine.

8. A process as defined in claim 6, wherein the condensation product is reduced and esterified with iron in the presence of a tertiary nitrogen base and chlorosulfonic acid, to yield a leuco sulfuric ester of the dyestuff, and the latter is converted to the corresponding alkali metal salt by reaction with an alkali metal basic compound.

9. A process for preparing a vat dyestuff of the dipyrazolanthrone series, which comprises heating dipyrazolanthrone with 3–10 times its weight of acrylonitrile in a reaction mixture containing 1–10% of a quaternary ammonium hydroxide at a temperature from 50–100° C. and separating the resulting condensation product from the reaction mixture.

10. A process for preparing a vat dyestuff of the dipyrazolanthrone series, which comprises heating 4,4'-dimethyldipyrazolanthrone with 3–10 times its weight of acrylonitrile in a reaction mixture containing 1–10% of a quaternary ammonium hydroxide at a temperature from 50–100° C. and separating the resulting condensation product from the reaction mixture.

11. A process for preparing a vat dyestuff of the dipyrazolanthrone series, which comprises heating 8,8'-diaminodipyrazolanthrone with 3–10 times its weight of acrylonitrile in a reaction mixture containing 1–10% of a quaternary ammonium hydroxide at a temperature from 50–100° C. and separating the resulting condensation product from the reaction mixture.

12. A process as defined in claim 9, wherein the condensation product is brominated by treatment with bromine in chlorosulfonic acid in the presence of iodine as a bromination catalyst.

13. A vat dyestuff having the following formula:

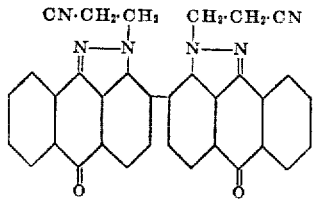

No references cited.

UNITED STATES PATENT OFFICE
CERTIFICATE OF CORRECTION

Patent No. 2,802,829                                    August 13, 1957

Wilhelm Schmidt-Nickels

It is hereby certified that error appears in the printed specification of the above numbered patent requiring correction and that the said Letters Patent should read as corrected below.

Column 4, line 16, before "the class" insert -- of --; lines 52 to 60, the formula should appear as shown below instead of as in the patent:

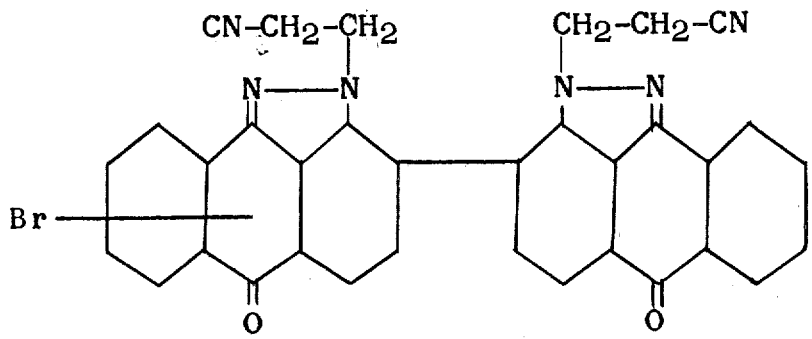

Signed and sealed this 18th day of April 1961.

(SEAL)
Attest:
ERNEST W. SWIDER
Attesting Officer

DAVID L. LADD
Commissioner of Patents